(12) United States Patent
Kargilis et al.

(10) Patent No.: US 6,712,420 B1
(45) Date of Patent: Mar. 30, 2004

(54) ZIPPER ASSEMBLY WITH INTEGRATED ELECTRICAL CONTACTS

(75) Inventors: John S. Kargilis, Northville, MI (US); John W. Pohill, Brighton, MI (US); Frank M. Lopick, Whitmore Lake, MI (US); E. Mackey King, Howell, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/310,783

(22) Filed: Dec. 6, 2002

(51) Int. Cl.[7] .................................................. B60J 1/10
(52) U.S. Cl. ........................ 296/146.15; 296/107.07; 219/203
(58) Field of Search ................. 296/146.14, 146.15, 296/145, 201, 107.07; 219/203; 439/34, 352

(56) References Cited

U.S. PATENT DOCUMENTS

| 4,220,298 | A | * | 9/1980 | Willis ........................ 296/148 |
| 4,539,466 | A | | 9/1985 | Yamamoto |
| 4,611,849 | A | * | 9/1986 | Trenkler ................. 296/146.14 |
| 4,685,462 | A | * | 8/1987 | Olsen ........................... 607/98 |
| 5,083,133 | A | | 1/1992 | Takayama |
| 5,543,601 | A | * | 8/1996 | Bartrug et al. ............... 219/203 |
| 5,654,721 | A | | 8/1997 | Saitou et al. |
| 6,147,654 | A | | 11/2000 | Nagy |
| 6,208,303 | B1 | | 3/2001 | Tachihara et al. |
| 6,239,758 | B1 | * | 5/2001 | Fuchs et al. ................. 343/713 |
| 6,307,516 | B1 | | 10/2001 | Zafar et al. |
| 6,396,445 | B1 | | 5/2002 | Saitoh et al. |
| 2002/0079718 | A1 | * | 6/2002 | Neubrand ................... 296/99.1 |

* cited by examiner

*Primary Examiner*—D. Glenn Dayoan
*Assistant Examiner*—Lori L Coletta
(74) *Attorney, Agent, or Firm*—Ralph E. Smith

(57) ABSTRACT

A convertible vehicle having a body with a removable soft top and a separate rear window with an electrically-operable component. The rear window being selectively attachable to and removable from the top. A separable fastener assembly such as a zipper is provided with the top and the rear window so that the electrically-operated component is electrically connected with a vehicle power supply upon attachment of the rear window to the soft top.

14 Claims, 1 Drawing Sheet

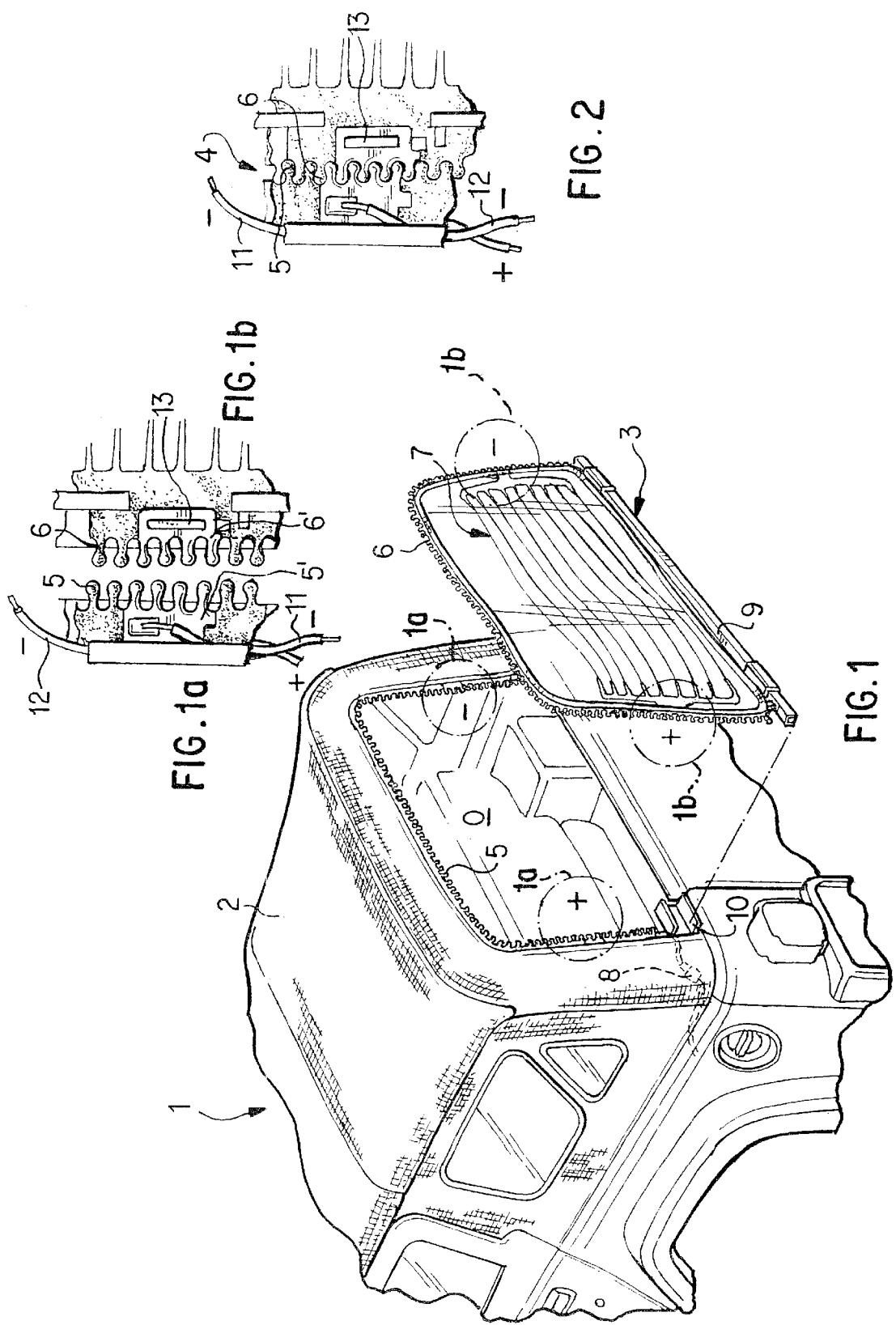

ZIPPER ASSEMBLY WITH INTEGRATED ELECTRICAL CONTACTS

BACKGROUND OF THE INVENTION

The present invention relates to a zipper assembly with integrated electrical contact for a vehicle or the like, and more particularly, to a zipper assembly for removable components in which integrated electrical contacts or connections are provided for running electrical components.

Vehicles such as the Jeep® Wrangler are provided with soft tops, e.g., vinyl, cloth or fabric tops that cover the top, sides and rear of such vehicles. The soft top can also include a plastic rear window that is removable from the soft top and vehicle body by way of a zipper arrangement or snaps.

In a case where it is desirable to provide the rear window with an electrical defogger assembly, special terminal connections have to be provided in the vehicle frame and the rear window piece to allow the rear window to be removed from the top. In addition to detracting from the appearance of the vehicle, these special electrical connections introduce additional cost into the production of the soft top and further require that the vehicle operator reestablish the electrical connections when reattaching the rear window to the soft top. Such connections can be broken and also will not provide the desired defogging of the vehicle if the driver neglects to reestablish the connections.

SUMMARY OF THE INVENTION

An object of the present invention is to provide a soft top arrangement which avoids the problem with rear window assemblies for soft tops.

A further object of the present invention is to provide an arrangement which improves the overall appearance of the vehicle by eliminating external connections and packaging of those connections.

Another object is to provide a soft top arrangement which eliminates the need for special or separate electrical terminals on the vehicle frame and the rear window and allows an electrical connection to be automatically established upon reinstallation of the rear window as it is zipped to the soft top assembly and avoids the need to manually plug and unplug the defogger with the electrical harness.

Still another object is to provide a system that can be used with other electrical components such as an antenna by itself or with a defogger installed in a removable windshield or with connectors other than zippers such as snaps and buttons.

A yet further object is to provide a fastening system that solves in an elegant and controlled manner the passage of current through an electrically-operated component in the vehicle.

BRIEF DESCRIPTION OF THE DRAWINGS

These and other objects, features and advantages of the present invention will become more readily apparent from the following detailed description of currently preferred configurations thereof when taken in conjunction with the accompanying drawings wherein:

FIG. 1 is a perspective partial view of a vehicle such as a Jeep® looking toward the rear thereof with the pliable window assembly removed;

FIGS. 1a and 1b are partial views of the zipper teeth provided on the soft top assembly and the pliable window assembly, respectively, in the area of the dashed circles on the left side of the vehicle as viewed in the direction shown in FIG. 1 in which the zipper teeth are constructed in accordance with the present invention; and FIG. 2 is a view of the zipper teeth shown in FIGS. 1a and 1b in the engaged assembled position when the window assembly has been attached to the soft roof.

DETAILED DESCRIPTION OF THE DRAWINGS

For ease of illustration and clarity of understanding, applicants will dispense with the description of conventional components such as the soft top assembly, the specific details of a rear winder defogger and their specific manner of connection with the vehicle electrical system. For a more detailed description of the latter as well as other components such as antennae that can employ the present invention, applicants incorporate by reference herein U.S. Pat. Nos. 4,539,466; 5,083,133; 5,654,721; 6,147,654; 6,208,303; 6,307,516; and 6,396,445. These documents are merely representative of the state of the art. Of course, the seminal zipper patent, U.S. Pat. No. 1,291,881, describes a separable fastener that has become part of everyday life and needs no explanation.

It is also to be understood that the features shown in FIGS. 1a and 1b on the left side of the vehicle are constructed in the same manner on the right side of the vehicle at the areas shown by the circular dashed lines. Moreover, although a zipper has been shown as the separable fastener in the illustrated embodiment, persons of ordinary skill will recognize that the inventive concept can be employed with other types of separable fasteners such as ziplocks and snaps and buttons.

Referring now to the drawings and, in particular to FIG. 1, there is shown a rear portion of a vehicle such as the type marked by the assignee of applicants under the JEEP registered trademark designated generally by numeral 1. The vehicle 1 is provided with a soft cover 2 made of vinyl, fabric, cloth or other types of manmade materials and a pliable rear window designated generally by numeral 3. The rear window 3 is selectively connected or removed from the soft top 2 by way of a zipper assembly designated generally by numeral 4 (FIG. 2) in which jaws or teeth 5 of one half of the zipper assembly 4 are joined in a generally known manner around a rear opening O in the soft cover 2 and jaws or teeth 6 on the other half of the zipper assembly 4 are joined in a generally known manner around the sides and top peripheral portion of the rear window 3.

The rear window 3 can be a clear plastic or other transparent material that is pliable and otherwise of sufficient structural stability and safety. It can also be conventional safety glass as used in a convertible top with a zip-out glass rear window. The window can incorporate a defogger and/or antenna assembly 7 that is electrically connected to the electrical system of the vehicle 1 through a connector wire 8, the details of which are known and dispensed with for clarity of explanation. The bottom edge of the rear window 3 is connected to a stiff hollow bar 9 made of metal or the like which can be used to locate and hold the rear window in brackets 10 on each side of the vehicle (only one being shown in FIG. 1).

The zipper jaws or teeth 5, 6 are made of a nonconductive material such as nylon except on the areas 5', 6' shown in FIGS. 1a and 1b (and on each side of the vehicle) where the jaws or teeth 5, 6 are made of a conductive material such as metal or the like. The conductive areas 1b formed by the conductive rear window zipper jaws or teeth 6' on the left and right sides of the rear window are electrically connected at a point 13 with the defogger and/or antenna assembly 7. Likewise, the conductive areas 1a formed by the conductive soft top zipper jaws or teeth 5' are electrically connected to the vehicle's electrical power supply (not shown) by the lead wires 11 and 12 soldered or the like to the teeth 5' via the cable connector assembly 8.

It will be understood that the operation of, for example, a defogger as shown in the illustrated embodiment requires that a potential difference exists to cause a suitably sized heating current to flow in the defogger wire elements. The left side of the vehicle is shown as the positive terminal and the right side as the negative terminal.

Upon assembling the rear window 3 in the opening O of the soft top 2 by pulling the conventional zipper slider from the lower side of either the top or the window to the other lower side thereof, the electrical connection for operating the defogger will be automatically established. Thereby, the vehicle operator can turn the defogger on and off from the instrument panel. If, for some reason, the operator has not completely zipped or fastened the rear window sufficiently to establish the connection, the instrument panel can be provided with an appropriate warning signal, although such a feature is optional and not illustrated.

Of course, it will be also understood that the zipper teeth can be constructed in other ways to make them selectively electrically conductible without departing from the scope of the present invention. Alternatively, separable snap fasteners can be used and contain the appropriate electrical connections between the defogger grid and/or antenna assembly and the vehicle electrical supply.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

We claim:

1. A vehicle, comprising a body, a window with an electrically-operable component operatively arranged thereat, the window being configured to be selectively attachable to and removable from the body, and a separable fastener assembly operatively associated with the body and the window such that the electrically-operated component is electrically connected with a vehicle connector wire upon attachment of the window to the body.

2. The vehicle according to claim 1, wherein the body comprises a soft top with an opening sized to receive the window.

3. The vehicle according to claim 1, wherein the separable fastener assembly is a zipper having mating teeth on the body and an outer edge of the window.

4. The vehicle according to claim 3, wherein the body comprises a soft top with an opening sized to receive the window.

5. The vehicle according to claim 4, wherein the mating teeth on the body are arranged at edges of the opening in the soft top.

6. The vehicle according to claim 1, wherein the separable fastening assembly includes conductive portions at the body and the window to establish an electrical connection between the electrically-operated component and the vehicle connector wire.

7. The vehicle according to claim 6, wherein the component is a defogger.

8. The vehicle according to claim 6, wherein the component is an antenna.

9. An assembly having a soft vehicle top having an opening and a separate window with an electrically operable component, the opening sized to receive the window, comprising a separable zipper provided at selected edges of the opening and window and configured to establish an electrical connection between the top and the electrically-operable component upon attachment of the separate window to the top.

10. The assembly according to claim 9, wherein the separable zipper includes conductive portions for establishing the electrical connection.

11. The assembly according to claim 10, wherein the component is a defogger.

12. A separable fastening assembly, comprising a zipper associatable with separable components that are to be selectively joined and unjoined and one of which includes an electrically-operable element, and conductive points at selected areas of the zipper for establishing an electrical connection with the element upon joining the separable components together.

13. The separable fastening assembly according to claim 12, wherein the zipper has selected portions in which the teeth are conductive, whereas remaining portions have non-conductive teeth.

14. A vehicle comprising two separate components, at least one of which has at least one electrically-operable component, and a zipper configured to simultaneously mechanically attach the two separable components together and electrically connect the at least one electrically-operable component to a vehicle connector wire.

* * * * *